United States Patent [19]

Yeh

[11] Patent Number: 5,444,620
[45] Date of Patent: Aug. 22, 1995

[54] APPARATUS FOR INDICATING DRIVING STATUS OF A VEHICLE

[76] Inventor: A-Chien Yeh, No. 359-2, Tung Kuang Street, Tung Shih Town, Taichung Hsien, Taiwan

[21] Appl. No.: 249,243

[22] Filed: May 25, 1994

[51] Int. Cl.[6] ............................................. F21Q 1/00
[52] U.S. Cl. ........................ 364/424.01; 340/464; 340/471
[58] Field of Search ............... 364/424.01, 426.01; 340/66, 71, 72, 464, 467, 469, 472, 471, 479

[56] References Cited

U.S. PATENT DOCUMENTS

| | | | |
|---|---|---|---|
| 3,492,638 | 1/1970 | Lane | 340/66 |
| 3,497,871 | 2/1970 | Damico | 340/71 |
| 3,875,559 | 4/1975 | Szekessy | 340/71 |
| 4,651,129 | 3/1987 | Wood et al. | 340/72 |
| 4,667,177 | 5/1987 | Athalye | 340/71 |
| 4,757,301 | 7/1988 | Neale, Jr. | 340/71 |
| 4,772,868 | 9/1988 | Chen | 340/72 |
| 4,825,191 | 4/1989 | Ching-Hwei | 340/472 |
| 4,933,666 | 6/1990 | Maple | 340/464 |
| 4,990,886 | 2/1991 | Stanulis | 340/467 |
| 5,231,373 | 7/1993 | Freeman et al. | 340/469 |

Primary Examiner—Gary Chin
Assistant Examiner—Russell W. Frejd
Attorney, Agent, or Firm—Sixbey, Friedman, Leedom & Ferguson

[57] ABSTRACT

An apparatus for indicating driving status of a vehicle includes a first light with a first color, a second light with second color, and a third light with a third color. The first light is turned on to emit the first color light when a driver of the vehicle is stepping an accelerator pedal of the vehicle. The second light is turned on to emit the second color light when the driver of the vehicle is stepping a brake pedal of the vehicle. The third light is turned on to emit the third color light when the driver is neither stepping the accelerator nor stepping the brake pedal.

4 Claims, 6 Drawing Sheets

# 5,444,620

APPARATUS FOR INDICATING DRIVING STATUS OF A VEHICLE

FIELD OF THE INVENTION

The present invention relates to an apparatus for indicating driving status of a vehicle, especially one which is indicative of when a driver of a vehicle is either stepping on the accelerator pedal, releasing the accelerator pedal, or stepping on the brake pedal, thus providing a following driver information about the driving status of the leading vehicle.

BACKGROUND OF THE INVENTION

Stop lights for warning a following driver that the leading vehicle is making a stop are used commonly, yet these lights alone are not able to indicate different statuses of a vehicle moving on the road. If a following driver can obtain more information about the leading vehicle, he/she can take more appropriate response on the road. It is therefore requisite to provide an indicating apparatus of a vehicle for providing more information to a following driver for safety purpose.

SUMMARY OF THE INVENTION

It is an object of the present invention to provide an apparatus for indicating driving status of a vehicle so that a following driver can immediately notice that the leading driver is either stepping on the accelerator pedal, releasing the accelerator pedal, or stepping on the brake pedal, and make a proper action in response to the indication.

It is one aspect of the present invention to provide an apparatus for indicating driving status of a vehicle comprising
 a power source including a negative pole and a positive pole;
 a first light for emitting a first color when it is electrically connected to the power source;
 a second light for emitting a second color when it is electrically connected to the power source;
 a third light for emitting a third color when it is electrically connected to the power source;
 a first relay and a second relay each of which includes a common contact, a normally-closed contact, and a normally-open contact;
whereby each of the first light, the second light and the third light includes a first terminal and a second terminal, the first terminals of the first, second, and third lights being connected to the negative pole of the power source, the first relay having the common contact thereof connected to the positive pole of the power source, the normally-open contact thereof connected to the second terminal of the first light, and the normally-closed contact thereof connected to a common contact of the second relay, the second relay having the normally-closed contact thereof connected to the second terminal of the third light and the normally-open contact thereof connected to the second terminal of the second light, the first relay being energized in response to a stepping on an accelerator pedal of the vehicle, the second relay being energized in response to a stepping on a brake pedal of the vehicle, thus when the accelerator pedal is depressed the first light is turned on, when the brake pedal is depressed the second light is turned on, when neither the accelerator pedal nor the brake pedal is depressed the third light is turned on.

DETAILED DESCRIPTION OF THE PREFERRED EMBODIMENTS

Figure 1:
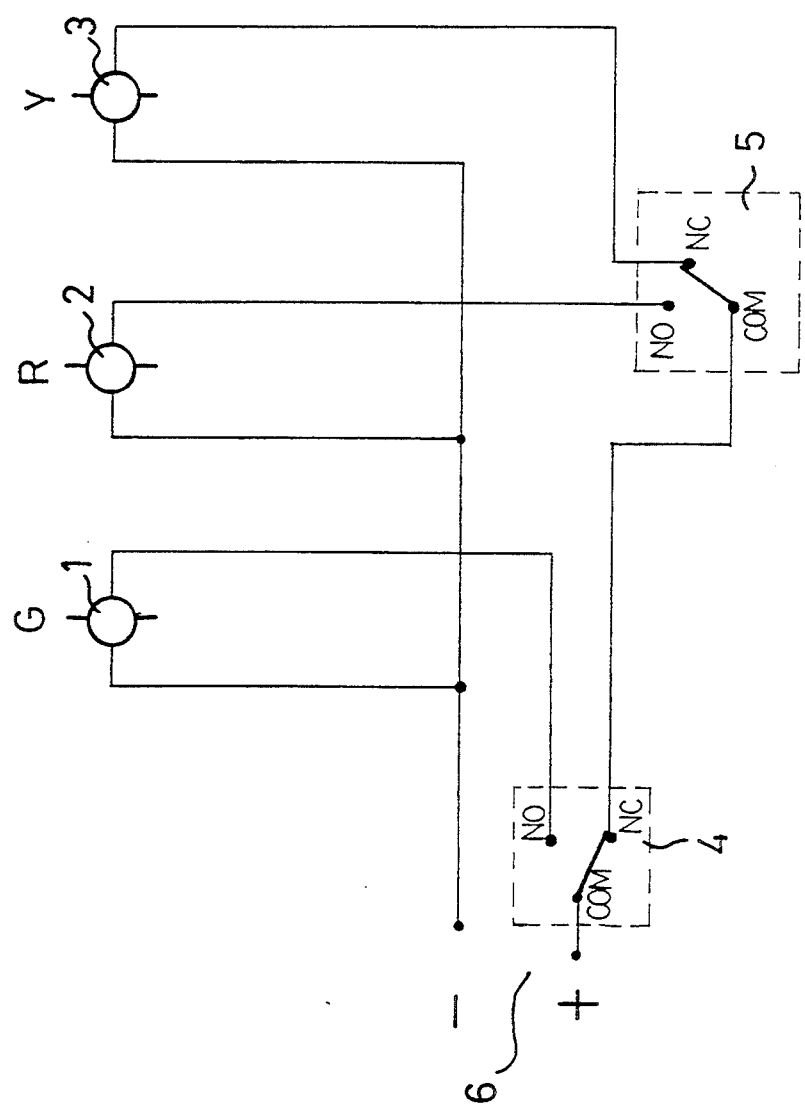
FIG. 1 is a schematic circuit diagram of an apparatus for indicating driving status of a vehicle.

Referring to the drawings and initially to FIG. 1, an apparatus for indicating driving status of a vehicle in accordance with the present invention comprises a first light 1 which is green for indicating that a driver of the vehicle is stepping on an accelerator pedal of the vehicle, a second light 2 which is red for indicating that the driver is stepping on a brake pedal of the vehicle, a third light 3 which is yellow for indicating that the driver is stepping on neither the accelerator pedal nor the brake pedal of the vehicle, a first relay 4, a second relay 5, and a power source 6 which includes a positive pole and a negative pole. Each of the lights 1, 2, and 3 includes a first terminal and a second terminal. Each first terminal of the lights 1, 2, and 3 is connected to the negative pole of the power source 6. The first relay 4 and the second relay 5 each include a common contact COM, a normally-open contact NO, and a normally-closed contact NC as are well known. The first relay 4 has the common contact COM thereof connected to the positive pole of the power source 6, the normally-open contact NO thereof connected to the second terminal of the first light 1, and the normally-closed contact NC thereof connected to the common contact COM of the second relay 5. The second relay 5 has the normally-closed contact NC thereof connected to the second terminal of the third light 3 and the normally-open contact NO thereof connected to the second terminal of the second light 2. The first relay 4 is appropriately connected to an accelerator pedal of the vehicle so that the first relay 4 is energized when the accelerator is stepped on. The second relay 5 is appropriately connected to a brake pedal of the vehicle so that the second relay 5 is energized when the brake is stepped on. If the driver steps neither on the accelerator pedal nor the brake pedal, the relays 4 and 5 are not energized as shown in FIG. 1, and the third light 3 (yellow) is electrically connected to the power source 6 and turned on thereby, thus indicating that the driver is not stepping on the accelerator pedal or the brake pedal. If the driver steps on the accelerator pedal, the first relay 4 is energized, therefore the first light (green) is electrically connected to the power source 6 and turned on thereby, thus indicating that the driver is stepping on the accelerator pedal. If the driver steps on the brake pedal, the second relay 5 is energized, therefore the second light 2 (red) is electrically connected to the power source 6 and turned on thereby, thus indicating that the driver is stepping on the accelerator pedal.

Figure 2:
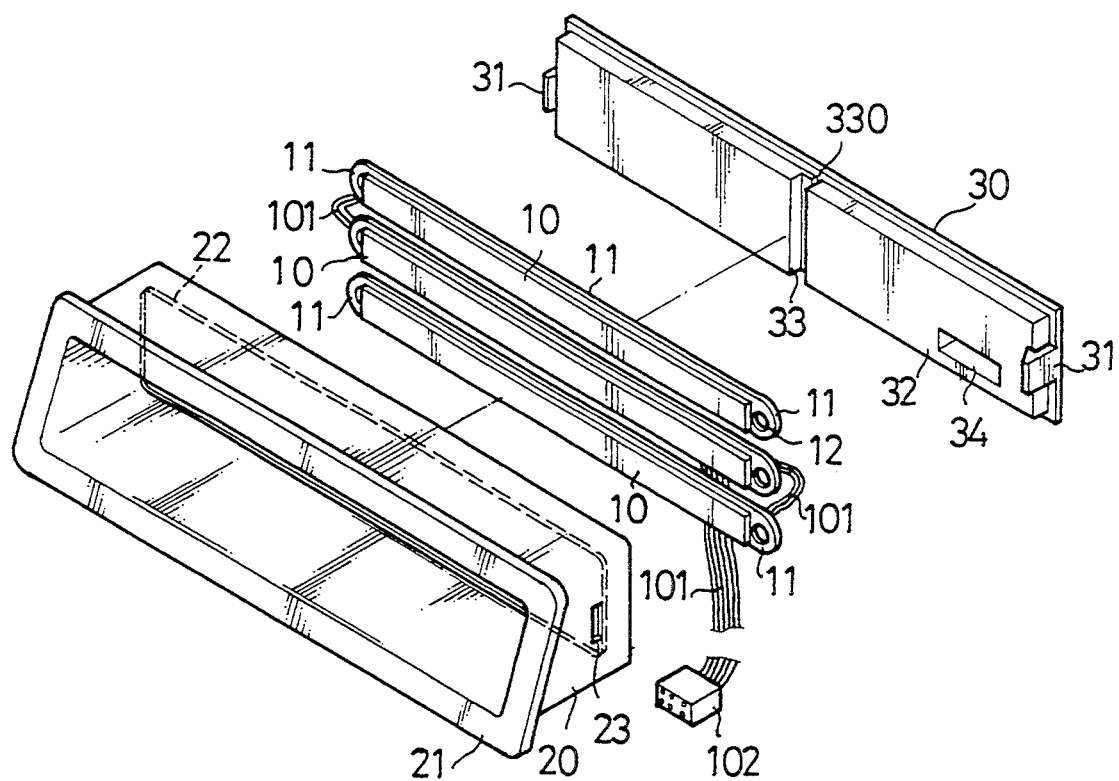
FIG. 2 is an exploded view of an apparatus for indicating driving status of a vehicle.
Figure 3:
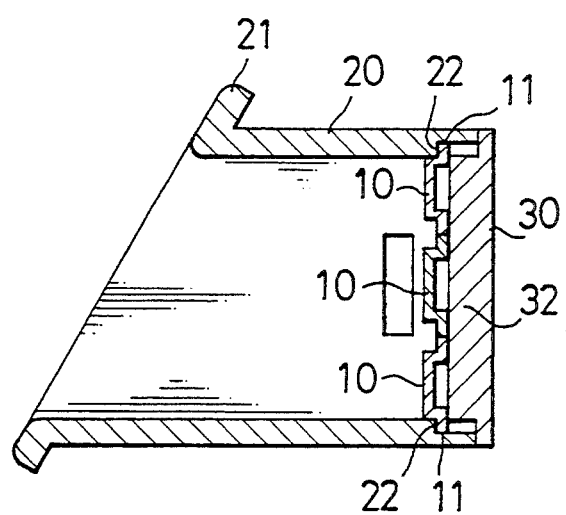
FIG. 3 is a cross-sectional view of an assemblied structure of FIG. 2.
Figure 6:
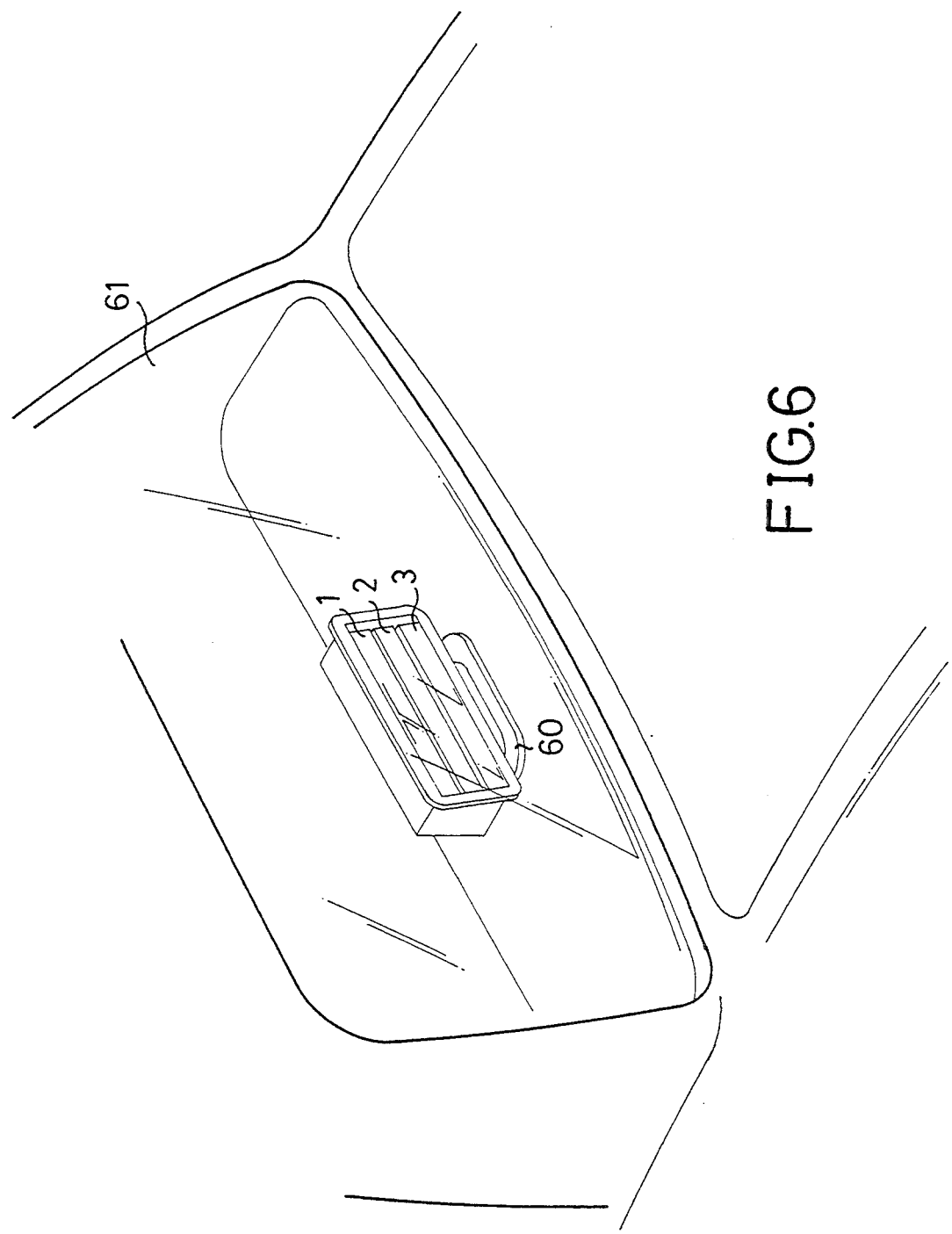
FIG. 6 illustrates that indicating apparatus of the present invention is installed at a rear end of a vehicle.

Referring to FIG. 2, a mechanical structure of the indicating apparatus is shown in exploded view. The lights 1, 2, and 3 are respectively received in a corresponding tube 10 which has a transparent face for light to emit. therethrough. A flange 11 extends from periphery of each tube 10. Two holes 12 each are defined in two distal ends of each tube 10. A plurality of wires 101 are connected between the lights 1, 2, and 3 and together are connected to a connector 102 which is further connected to the circuit as shown in FIG. 1. A hollow frame 20 including a front opening at a front end and a rear opening at a rear end thereof. A flange 21 is extended from the front opening thereof allowed to be stuck on an inner periphery of a rear window by glue. A groove 22 is defined along the entire inner periphery of the hollow frame 20 near the rear opening thereof. The three tubes 10 are located in the hollow frame 20 in a top-down manner, with the flanges 11 thereof being received in the groove 22 of the hollow frame 20. Two slots 23 are defined in two sides of the hollow frame 20. A rear panel 30 includes two protrusions 31, a first groove 33 and a second groove 330 being defined between the two protrusions 32, with the second groove 330 having a width less than that of the first groove 33. An aperture 34 is defined in the rear panel 30 allowing the wires 101 and the connector 102 to pass therethrough, The rear panel 30 is secured to the hollow frame 20 by means of the two snapping tabs 31 engaged in the two slots 23 of the frame 20. FIG. 3 illustrates the tubes 10 and the ]rear panel 30 are secured to the frame 20. Referring to FIG. 6, the indicating apparatus may also be connected to a bracket 60 which is located near a rear window 61 of the vehicle.

Figure 4:
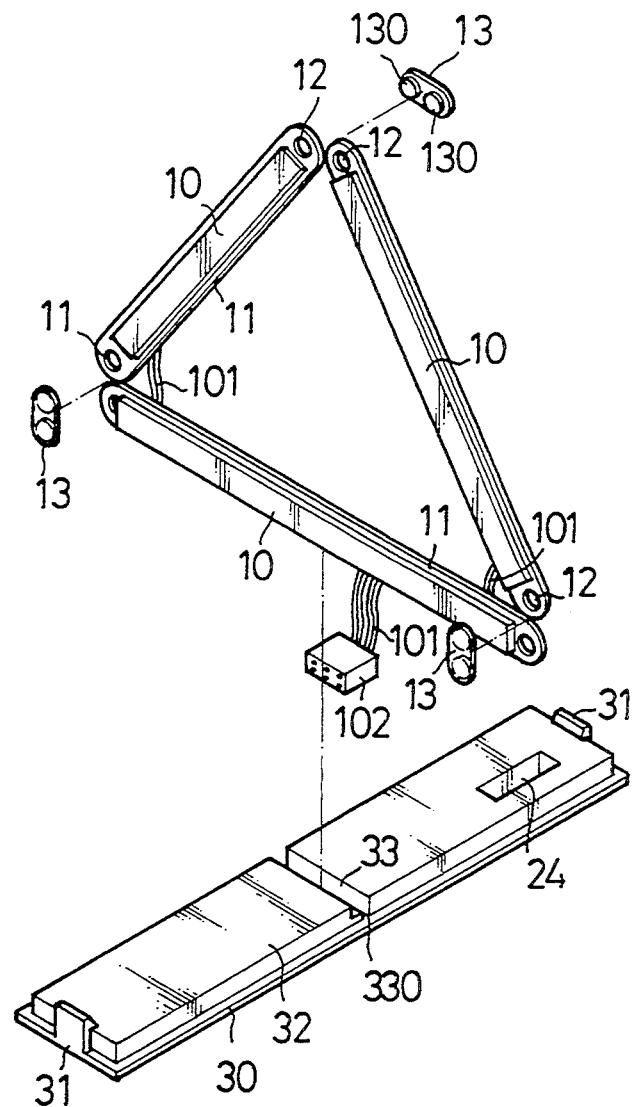
FIG. 4 illustrates that the indicating apparatus of the present invention is allowed to be reassembled to be a triangular warning light for warning other vehicles that the vehicle is malfunctioned.

When the vehicle has malfunctioned, the tubes 10 are allowed to be removed from the frame 20 and reassembled to be a triangular indicator for warning purpose. Referring to FIG. 4, three connectors 13 each having two bosses extending therefrom are used to connect the three tubes 10 to be a triangular indicator. Each connector 13 connects two adjacent tubes 10 at the holes 12 thereof. The triangular indicator is located on the rear panel 30, with a longitudinal portion of one of the tubes 10 being received in the first groove 33 of the rear panel 30. More specifically, the flange 11 of the tube 10 is received in the second groove 330 of the rear panel 30.

Figure 5:
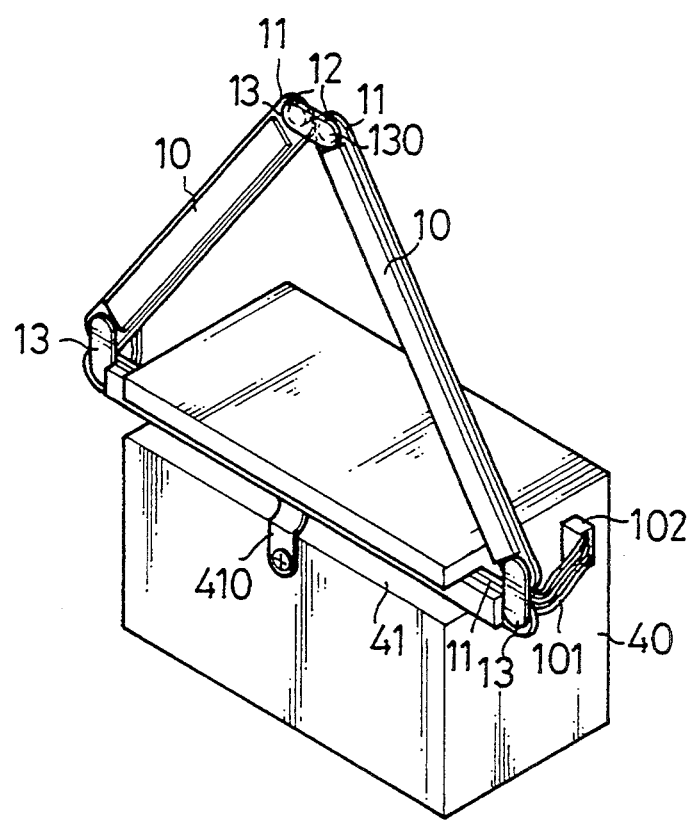
FIG. 5 illustrates the triangular light of FIG. 4 is fixed on a base.

Referring to FIG. 5, the triangular indicator may also be located on a battery box 40 which includes batteries therein to replace the power source 6 of the vehicle. The battery box 40 includes a longitudinal recess 41 for receiving one of the tubes 10 which in combination with the two other tubes constitute the triangular indicator. A pivotable stop 410 is installed on the box 40 for limiting the tube 10 in the recess 41. The user can take out the triangular indicator from the recess 41 of the box 40 by pivoting the pivotable stop 410 to the left or right.

I claim:

1. An apparatus for indicating driving status of a vehicle comprising
a power source including a negative pole and a positive pole;
a first light for emitting a first color when it is electrically connected to the power source;
a second light for emitting a second color when it is electrically connected to the power source;
a third light for emitting a third color when it is electrically connected to the power source;
a first relay and a second relay each of which includes a common contact, a normally-closed contact, and a normally-open contact;
three tubes each of which receives one of the three lights and has a transparent face for light to be emitted therethrough, a flange extending from the periphery of each said tube and defining two holes at two distal ends thereof, three connectors each having two bosses extending therefrom for detachably connecting any two of the three tubes, thus linking the three tubes to be a triangular indicator to warn other drivers when the vehicle has malfunctioned;
whereby each of said first light, said second light and said third light includes a first terminal and a second terminal, said first terminals of said first, second, and third lights being connected to the negative pole of said power source, said first relay having the common contact thereof connected to the positive pole of the power source, the normally-open contact thereof connected to the second terminal of the first light, and the normally-closed contact thereof connected to the common contact of the second relay, the second relay having the normally-closed contact thereof connected to the second terminal of the third light and the normally-open contact thereof connected to the second terminal of the second light, said first relay being energized in response to a stepping on an accelerator pedal of the vehicle, said second relay being energized in response to a stepping on a brake pedal of the vehicle, thus when the accelerator pedal is depressed said first light is turned on, when the brake pedal is depressed said second light is turned on, when neither the accelerator pedal nor the brake pedal is depressed said third light is turned on.

2. The apparatus as claimed in claim 1 further comprising a hollow frame including a front opening at a front end and a rear opening at a rear end thereof, a flange extended from the front opening thereof allowed to be stuck on an inner periphery of a rear window of the vehicle by glue, a groove defined along an entire inner periphery of the hollow frame near the rear opening thereof; whereby the three tubes may be separated from the triangular indicator and relocated in the hollow frame in a top-down manner, with the flanges thereof being received in the groove of the hollow frame.

3. The apparatus as claimed in claim 2 further comprising two slots defined in two sides of the hollow frame, a rear panel including two snapping tabs at two distal ends thereof for engaging into the two slots of the frame when the rear panel is secured to the hollow frame at the rear end thereof.

4. The apparatus as claimed in claim 3 further comprising two protrusions formed at the rear panel, a first groove and a second groove being defined between the two protrusions, with the second groove having a width less than that of the first groove, whereby the triangular indicator linked by the three tubes is allowed to be located on the rear panel when the rear panel is taken off from the hollow frame, with a longitudinal portion of one of the tubes being received in the first groove of the rear panel and a flange portion extended from the longitudinal tube portion being received in the second groove of the rear panel.

* * * * *